United States Patent
Baldeweg et al.

(10) Patent No.: US 6,734,847 B1
(45) Date of Patent: May 11, 2004

(54) METHOD AND DEVICE FOR PROCESSING IMAGED OBJECTS

(75) Inventors: Frank Baldeweg, Lauenstein (DE); Torsten Baldeweg, Lauenstein (DE)

(73) Assignee: Dr. Baldeweg GmbH, Dresden (DE)

( * ) Notice: Subject to any disclaimer, the term of this patent is extended or adjusted under 35 U.S.C. 154(b) by 0 days.

(21) Appl. No.: 09/530,503

(22) PCT Filed: Oct. 28, 1998

(86) PCT No.: PCT/DE98/03138

§ 371 (c)(1),
(2), (4) Date: Apr. 28, 2000

(87) PCT Pub. No.: WO99/23586

PCT Pub. Date: May 14, 1999

(30) Foreign Application Priority Data

Oct. 30, 1997 (DE) .......................... 197 47 881
Nov. 26, 1997 (DE) .......................... 197 52 341

(51) Int. Cl.[7] .................................. G06T 15/00
(52) U.S. Cl. ........................... 345/419; 345/771
(58) Field of Search ...................... 345/419, 420, 345/424, 771; 382/6, 173

(56) References Cited

U.S. PATENT DOCUMENTS

| | | | |
|---|---|---|---|
| 4,879,668 A | 11/1989 | Cline et al. ................. 345/424 |
| 5,185,809 A | * | 2/1993 | Kennedy et al. ............. 382/6 |
| 5,228,443 A | | 7/1993 | Tatar ......................... 600/409 |
| 5,754,688 A | * | 5/1998 | Gatlin et al. ................ 382/193 |

FOREIGN PATENT DOCUMENTS

| | | |
|---|---|---|
| EP | 0 635 805 A1 | 1/1995 |
| WO | WO 91/14397 A1 | 10/1991 |
| WO | WO 94/24640 A1 | 10/1994 |
| WO | WO 96/13207 A1 | 5/1996 |
| WO | WO 96/29677 | 9/1996 |

* cited by examiner

Primary Examiner—Almis R. Jankus
(74) Attorney, Agent, or Firm—Alston & Bird LLP

(57) ABSTRACT

The invention discloses a method for processing image objects in three-dimensional displays, wherein an image object is displayed by an image generating means in a virtual image space, wherein pixels of the three-dimensional image space can be reached by a selection device, and wherein a computer allocates coordinate values to the image object in accordance with its position. At least one pixel of the image object is marked for processing by the selection device. The invention also discloses an apparatus for processing and modifying three-dimensional displays, the apparatus comprising a computer for generating image data, a display screen for displaying the image data in three-dimensional form in a virtual image space, and a pointing device for manually influencing the three-dimensional display. The pointing device is freely movable in the image space and comprises a transmission means for transmitting its position, with the computer allocating a pixel of the three-dimensional display to the pointing device in accordance with its position.

35 Claims, 1 Drawing Sheet

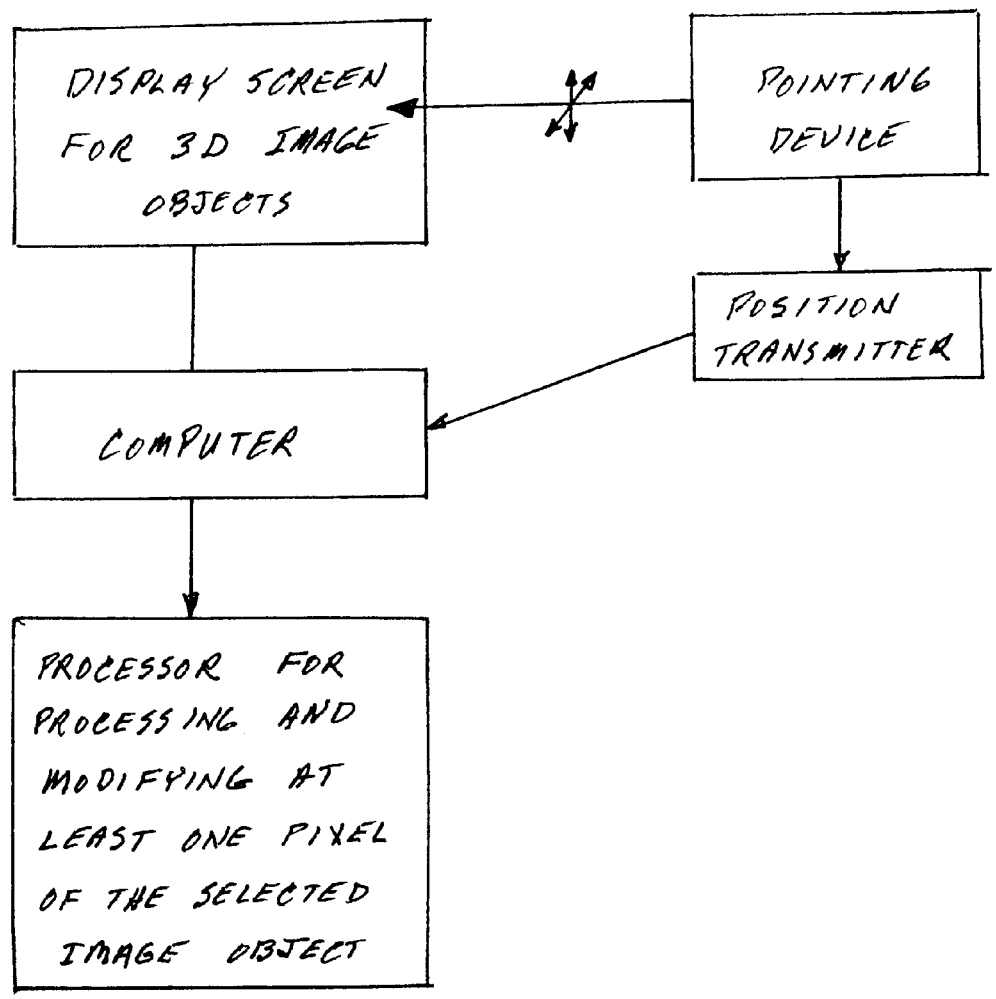

METHOD AND DEVICE FOR PROCESSING IMAGED OBJECTS

BACKGROUND OF THE INVENTION

The invention relates to a method of processing image objects in three-dimensional displays, wherein an image object is displayed in a virtual image space by an image generating means, wherein pixels of the three-dimensional image space can be reached by using a selection device, and wherein a computer allocates coordinate values to the image object corresponding to its position. The invention further relates to an apparatus for processing and modifying three-dimensional displays, the apparatus comprising a computer for generating image data, a screen for a three-dimensional display of the image data in a virtual image space, and a pointing device for manually influencing the three-dimensional display. According to the invention, this device may be used as selection device in the above-described method.

Various methods of representing three-dimensional image objects are known. In the case of the anaglyphic technique, perspectives for the right and the left eye are represented in the colors red and green. To obtain a three-dimensional effect, red-green spectacles will be needed. However, the anaglyphic technique does not allow a color representation.

Furthermore, the shutter technique is known, wherein the respective perspectives for the two eyes are represented one after the other. Channeling with respect to one eye occurs through spectacles, which switch the perspectives to the correct eye.

Also known is the autostereoscopic display, which requires no additional spectacles. Both perspectives are simultaneously displayed. Channeling occurs through optical means, such as lenses or prisms. The viewer motion is picked up and supplied via the optical means to the respective eye. Both perspectives are alternately contained in the LCD gaps of a display screen. Via prism masks of the display screen, the perspectives are supplied respectively to the right and the left eye. The three-dimensional image appears to float in front of the display screen.

Likewise known for image processing are selection devices, for example, a computer mouse, through which the individual pixels of the display can be reached. However, in this connection the display is present in two-dimensional or quasi three-dimensional form, so that the selection of a pixel is complicated. In this process, one makes do with rotating the image object, until a rearward layer of a three-dimensional image object is arranged on the two-dimensional display screen such that the desired pixel can be selected. In connection with the referenced three-dimensional display methods, this kind of image processing is, however, circumstantial, time-consuming, and inaccurate.

Apparatus for processing and modifying two-dimensional displays in graphic or CAD systems are known. In these systems, displays are processed on a screen of a computer with a so-called mouse that can be moved back and forth on a substrate by means of rolls. The movement of the mouse relative to its substrate is detected and converted into cursor movements. Because of the limited two-dimensional mobility of the mouse, three-dimensional displays have the disadvantage that it is complicated to select pixels in a virtual three-dimensional image space or in a rearward situated image layer. In most cases the three-dimensional display is resolved to a two-dimensional view, so that it is possible to select a certain image layer.

It is the object of the invention to describe a method and an apparatus for processing and modifying three-dimensional displays, which enable a simple selection and processing of three-dimensional image objects.

BRIEF DESCRIPTION OF THE DRAWINGS

The accompanying drawing is a block diagram of a method and apparatus for processing image objects in three-dimensional displays in accordance with the present invention.

SUMMARY OF THE INVENTION

The above and other objects and advantages of the invention are achieved by a method and apparatus wherein an image object is displayed by an image generating means in a virtual image space, and wherein pixels of the three-dimensional image space can be reached by a selection device. A computer allocates coordinate values to the image object in accordance with its position, and at least one three-dimensional section of the image object is marked by the selection device for processing.

It has been recognized by the invention, that in a three-dimensional display, which generates an image volume, it is possible to mark an image object in the image space itself. Contrary thereto, marking in the case of two-dimensional display screens with the usual two-dimensional display occurs by rotating the body or by changing its position and a subsequent, two-dimensional or quasi three-dimensional marking. According to the invention, an image object projected into the space is marked directly in the virtual image space. Consequently, the operator is able to view simply the marking of the spatial section either by changing the position of the viewer or by changing the position of the body. A computer with vector graphics and different input and output devices assists in the three-dimensional, in particular autostereoscopic display, computes the position of the marking in the image object, and displays the marked sections of the image object in the three-dimensional display.

The method of present invention can be very advantageously used for object recognition and measuring in molecular physics, for the inspection and quality assurance in the semiconductor industry, in metallurgy, and metal processing. Likewise advantageous is its use in CAD processes, in connection with object recognition, image capture, reconstruction, display and measurement of image objects. The method can be applied to virtual prototyping (mockup), as well as in the virtual workshop. Further fields of applications are in microbiology, namely segmentation and measurement of spatial arrangements, such as nucleus structures, chromosomes, etc., and cytology, ophthalmology, neurodiagnosis, and angiography in the field of medicine.

In a very advantageous further development of the invention, the marked image object is segmented with respect to other image objects displayed in the image space. In this process, the image object is divided into individual segments, with the computer storing during the segmentation respectively the boundary regions of the individual segments in the three-dimensional space and data for the allocation of a segment. The segmentation is the basis for the image-analytical further processing of the three-dimensional display. In this process, image volumes are defined in their three-dimensional display and divided into segments, which are accessible to different image processing operations. This process assists in particular morphometry, i.e., segmentation and measurement of 3-D image objects in three-dimensional images.

In the process of marking or segmenting, the selection device is directed in the virtual image space to the image object, or guided along the boundary regions of the image object. The thus-marked image object may be enhanced, in particular colored or enlarged, thereby making the selected spatial sections better visible in the three-dimensional display.

In a further development of the invention, the marked spatial section of the image object is measured. Just in the field of medicine, where different imaging methods are used, such as laser tomography, X-ray tomography, and MR tomography, or displays from microscopy, it is possible to produce therefrom three-dimensional displays. To measure image objects in the image space, it is necessary to mark at least two pixels, or preferably spatial sections of an image object. In this manner, it is possible to use the individual data of the known two-dimensional or the quasi three-dimensional representations in the three-dimensional display and to measure them, with little expenditure, in the image space with the aid of the autostereoscopic display. Advantageously, during the measurement the accuracy is increased and the analysis or diagnosis process is objectified. It is preferred to cut out the marked section of the image object from the three-dimensional display and to display it separately.

It is possible to segment and/or measure the image object automatically by the processing procedures of the computer. To this end, it is preferred to store data for generating reference objects in a storage device of the computer. Based on the reference objects, an automatic segmentation and measurement of relevant image objects occurs in the three-dimensional image space. In the case of segmentation, measurement, or selection of a specific image object in the display, it is possible to use image-analytic, cognitive systems, and systems based on knowledge, in particular even neural networks. The automatic segmentation, for example, segmentation of a liver within a medical, three-dimensional display of a patient's body makes it possible to increase performance and objectify the analysis/diagnosis process.

The manual segmentation or measurement of relevant sections of an image object in the three-dimensional image space can be used for preparing the automatic process or for verification. In the automatic segmentation based on reference objects, for example, objects of a certain size, shading, or shape, it is possible to make a preselection in the three-dimensional display by processing procedures of the computer, and to perform a subsequent manual processing with the aid of the selection device or via the keyboard of the computer.

The computer can make available processing procedures, such as preprocessing by filtering, generating image data, or compressing image data. Likewise, the processing procedures may provide for a cognitive modeling, calibration, or morphometrical evaluation of the three-dimensional display. The processing procedures make it possible to modify the three-dimensional display to such an extent, until a formalized representation is present, which satisfies the special knowledge of an expert, for example based on output signals, neural networks, or knowledge-based systems.

In another further development of the invention, basic processing procedures for processing the image objects and for applying the method and specific analysis, diagnosis, calibration, and interface procedures, are made available in particular on the computer. The core of the method is the coupling of a process assisted by autostereoscopic visualization, which is preprocessed by basic processing procedures, such as alignment, filtering, deconvolution, bitmapping, etc. Specific processing procedures enable 3-D manipulation, manual segmentation, measurement, and morphometric evaluation. A menu control faded into a three-dimensional display enables a dialog-oriented, interactive coupling of manual and automatic subprocesses for purposes of preparing an analysis and diagnosis model with adequate performance.

In a particularly advantageous further development of the invention, the three-dimensional display occurs in autostereoscopic form. In this instance, the image generating means is a display screen, in front of which the three-dimensional representation appears to float in the image space. The selection device is a 3-D pointer or a pointing stylus, which is used for displaying a certain pixel in the virtual image space and selecting it via a push-button on the pointing stylus.

Further advantageous developments of the invention will become apparent from the dependent claims and the following description of three embodiments of the invention.

In a first embodiment of the invention, the method is applied in the diagnosis of brain tumors, seizures, or similar diseases in the field of medicine. The head of a patient is analyzed via computer tomography, magnet spin tomography, or x-ray processes, and the results are used for the three-dimensional display. The method permits localizing and measuring automatically by knowledge-based systems, for example, tumors by way of their shading in the x-ray pictures. With the aid of the pointer, it is also possible to segment image objects of interest, i.e., areas, in which a tumor is to be suspected, to cut out same, and display them enlarged in pseudocolors. In this manner, it is possible to improve medical diagnosis significantly.

In a second embodiment of the invention, a tomogram is prepared by means of the positron emission tomography (PET), and a three-dimensional representation is generated therefrom. During the manual segmentation and measurement, the reconstructed image is displayed in autostereoscopic form for evaluating the topology of the tumor. The object areas relevant for the examination are manually segmented, the morphological features are determined and measured. Furthermore, reference objects are developed therefrom as learning information within the scope of a cognitive model of the analysis or diagnosis problem. In the case of automatic segmentation and measurement, the evaluation occurs on the basis of the previously determined diagnosis model. This includes automatic segmentation and measurement of relevant sections in the image object. By way of interaction, it is possible to determine the diagnosis model, via a manual subprocess, with the aid of a neural network, and to actualize it in real time.

A third embodiment of the method according to the invention relates to quality assurance in the production of electronic devices. For an automatic inspection of soldering points with a throughput of several thousand soldering points per minute, the usual test criteria include solder distribution, solder quantity, component positioning, and errors in the solder volume. Via a display screen connected to a computer, an autostereoscopic, three-dimensional display is generated which floats in the image space in front of the display screen. The 3-D graphics is a vector graphic, which permits displaying the soldering points with a high resolution. With the aid of a 3-D pointer, the three-dimensional display is segmented and measured. To evaluate the quality characteristics, the three-dimensional image as determined from x-ray pictures or a tomography is displayed in autostereoscopic form. The object areas relevant for the inspection are manually segmented, the morphological characteristics are determined and measured. Measured image objects may be stored as learn information in the memory of the computer. Thus, for example, input data for neural networks are determined with the object of an automatic segmentation or measurement on the basis of a diagnosis model, for example, a combination of knowledge-based systems and neural networks. The automatic segmentation and/or measurement can interactively be connected with the manual segmentation and/or measurement. Likewise, it is possible to draw with a stylus artificial image objects, such as, for example, a desired solder distribution, as reference objects in the three-dimensional image space.

The apparatus for carrying out the method of the present invention includes a computer for generating image data, a display screen for a three-dimensional display of the image data in a virtual image space, and a pointing device for manually influencing the display and which is freely moveable in the image space. A position transmitter is provided for transmitting the position of the pointing device to the computer. The computer allocates a pixel of the three-dimensional display to the pointing device in accordance with its position.

It has been recognized by the invention that it is not necessary to resolve the three-dimensional display for selecting and for processing individual objects. With the use of the pointing device, it is possible to select an object in the virtual image space. In this process, the pointing device is not guided on a two-dimensional substrate, but can be moved by the operator freely in the space. The position of the pointing device is transmitted to the computer via a transmission means. The movement in the space occurs, for example, by the operator's hand in front of the body. A change in the position of the pointing device in the space leads to the displacement of a virtual cursor in the virtual image space. Advantageously, the method is applicable to stereoscopic methods with the use of spectacles, such as, for example, the anaglyphic technique, wherein two perspectives are produced for each eye in a red and green-colored representation, or the shutter technique, wherein the perspectives are represented one after the other and can be switched to the correct eye through a pair of spectacles.

Very advantageously, however, the invention can be applied to autostereoscopic, three-dimensional displays, which do not require additional glasses as an aid to vision. In this connection, the perspectives for both eyes are simultaneously displayed for both eyes, and optical means generate each a perspective for the corresponding eye. To this end, the motion of the viewer is acquired, and both perspectives are supplied, for example, by prisms, to the individual eye. According to the invention, a pixel in the illustrated, three-dimensional object is selected, processed, and modified via the movement of the pointing device. From the movement of the pointing device, the computer determines the associated pixels of the three-dimensional display.

In a preferred embodiment of the invention, the computer allocates to the pointing device exactly the pixel, to which the pointing device is directed in the virtual image space. In particular, in the autostereoscopic display, the pointing device can be movable in the virtual image space, i.e., within the three-dimensional display. In this manner, the pointing device permits selecting a three dimensional object. The position of the pointing device is transmitted by the transmission means to the computer, which computes the corresponding pixel of the three-dimensional representation and displays it in the three-dimensional object, in particular via a cursor.

In accordance with the invention, the pointing device comprises a transmission means. Preferably, the transmission of data occurs wireless via a transmitting and/or receiving unit. To this end, the position and control signals are transmitted via a radio or infrared transmission path from the pointing device to the receiving unit in the computer. However, it is also possible to pick up the position in the space via a metal detector, which detects a metal head of the pointing device. Finally, the transmission means could also be a simple connecting cable between the pointing device and the computer.

Preferably, the pointing device is designed and constructed a pointing stylus, in particular with a tip that is locatable in the space. The pointing stylus may have the size and shape of a ballpoint pen. In this case, the pointing stylus itself is designed and constructed as an antenna for the transmitting and/or receiving unit. In a simple manner, the pointing device can be guided to a position in the virtual image space, so that it is possible to process and modify a three-dimensional object.

The pointing device may comprise at least one selection means, in particular a push-button, for selecting a pixel and/or for starting a processing. The selection means permits determining the starting or ending point of a movement in the virtual space, or selecting a certain three-dimensional object. However, the selection means also permits selecting certain processing procedures via a display window from a menu control, which is virtually faded into the three-dimensional image space.

In a another further development of the invention, one of the different processing procedures can be associated to the pointing device as a virtual tool head for purposes of processing the three-dimensional display. The processing procedures include, for example, modeling, such as raising or deepening contours, applying gravures or textures, segmenting, filtering, shading, coloring, or drawing. One of the processing procedures of the pointing device is assigned either to the pointing device ahead of time, or the processing procedure is selected during the processing from menu windows that are virtually displayed in the space. After positioning the pointing device, the processing procedure is started, for example, via a push-button. In so doing, the push-button may be used by continuous actuation for generating lines or for modeling.

The modification of the three-dimensional display can be calculated in the computer by means of the processing procedure that is linked to the pointing device, and it can be displayed on the screen, in particular in real time. The changes made by the pointing device are immediately displayed, so that the operator receives a response to the processing of the three-dimensional display. Finally, it is possible to store the changes of the three-dimensional display in the computer.

Preferably, the pointing device receives the processing procedure via the keyboard or via a menu control faded into the three-dimensional display, for example, via pulldown menus of a user interface.

Upon request, it is possible to fade into the virtual image space an icon, which corresponds to the position of the pointing device. This means that the icon can be displayed on the pixel allocated to the pointing device. Preferably, the icon is a blinking cursor, a hand, or a tool. For example, in the medical application, it is possible to display a scalpel.

It is preferred to assist in the positioning of the pointing device by means of a virtual scale in the three-dimensional image space or other measuring functions. In this connection, the scale may a metric or a logarithmic scale, which can be displayed in the three-dimensional image space. In addition, it is also possible to apply with the pointing device icons or marking elements to the display. Both the measuring functions and the processing procedures can be stored in a library of the computer.

Preferably, the three-dimensional display on the screen occurs in autostereoscopic form. To this end, a 3-D display will be needed, which generates one perspective each for one eye and specially reworks same by optical means for one of the two eyes. In this process, a three-dimensional display develops, which appears to float in the image space before the display screen.

Further advantageous embodiments of the invention are disclosed in the dependent claims and description. Two advantageous embodiments of the invention are described in the following.

The apparatus of the present invention according to the first embodiment comprises a computer, an autostereoscopic display screen, and a 3-D pointing device. The tip of the pointing device contains an infrared transmitter, which permits determining the coordinates of the tip in the image space and calculating same by the computer. Via a keyboard of the computer, the pointing device receives processing procedures, which operate as a virtual tool head on the tip of the pointing device. In this connection, it is also possible to adjust certain parameters, such as size, kind, and amount of the changes. Influenced by the computer, processing becomes effective even in the displays presented in autostereoscopic form. To this end, the computer is provided with rapid vector graphics, which indicate in the three-dimensional display the changes made by the pointing device.

In a second embodiment, the apparatus comprises a pointing device designed and constructed as a 3-D stylus, a stereoscopic observation system as a viewing and transmitting system for the position of the stylus or the operator, an autostereoscopic 3-D display screen, an interface system, a processing system in the form of a computer, and a calibration system.

For example, the 3-D stylus is equipped with one or more infrared diodes and is correspondingly moved by the operator in the sensitive image area. The light spots of the infrared diodes are located by the observation system, which comprises two cameras. The positions of the light spots taken by the cameras are measured and stored in the computer by the observation system. A second light spot, which is to be distinguished from the light spot of the tip of the 3-D stylus by a temporal, spatial structure or color, is provided, so as to be able to determine not only the position, but also the location of the stylus in the space. Because of the second light spot, it is also possible to determine the angle of rotation of the stylus during rotational motions. Due the light spots, the operator sees the position and location of the stylus in the optical display by the autostereoscopic screen, and is thereby able to orient and move the 3-D stylus accordingly.

The calibration makes it possible to determine a stereoscopic image that is specific for the operator, and to use its for a display. Furthermore, the pointing stylus allows to adapt to each other the coordinates of the virtual display of the observation system and of the operator. The metric determined from the measuring operation, for example, by the cameras, can be taken over for the entire display on the display screen of the computer.

The position of the stylus and, thus, of the operator can be determined possibly via a further stereo camera system. In this instance, the position of the operator is computed for the stereo image, for example, in such a manner that the virtual object remains stable in the space.

The 3-D stylus may comprise an ergonomically styled casing in the fashion of a ballpoint pen, which contains one to five IR transmitting diodes, which connect to one or more, mechanically stable optical fibers. The IR transmitting diodes are externally supplied with electric current via cables or accumulators, and thus are independent of electric conductors.

The IR transmitting diodes transmit continuous or modulated signals, whereby two different infrared light spots originate in the virtual space at a certain distance from each other. These IR light spots are picked up and decoded for determining the position and location of the stylus.

The 3-D stylus may comprise two push-buttons, of which the one activates the transmission function, and the other makes it possible to determine several processing functions, including calibrating, status via cable, status via transmitter, unidirectional or bidirectional reception.

In the simplest case, only one light spot is necessary to identify the tip of the 3-D stylus. However, in this instance the selection of the processing functions can occur only independently of the location of the stylus.

The observation system of the present invention is designed and constructed as a stereoscopic two- or three-camera system. It is possible to use a further camera system for recording the position, viewing direction, or spacing between the operator's eyes. The arrangement of the camera systems defines the sensitive image space, wherein it is possible to define this sensitive image space by brightness and depth of focus.

For the observation system, it is preferred to use CCD cameras, fast frame grabbers, image storage arrays, PCI bus-oriented acquisition and processing techniques.

The display is designed and constructed as an autostereoscopic 3-D display, wherein for the viewer the displayed objects appear to be represented in a virtual image space in front of the actual display.

The digital interface has to ensure the communication between the stylus and observation system and the computer. This interface may be designed as an infrared interface or as a conventional interface based on electrical conductors.

With the use of the processing system, for example, the computer, the actual stylus position is detected, stored, and used as needed in connection with graphic displays.

The calibration system has the function of ensuring adaptation and transformation of the reference systems. The 3-D stylus is detected in the viewer space by the camera systems and displayed in the image space in front of the autostereoscopic display screen. The calibration system adapts the autostereoscopic display with respect to the real position of the 3-stylus. However, the calibration system allows adjustments of the images to individual image characteristics of the operator. To this end, a virtual 3-D calibration space is made available to the operator, in which the operator performs the calibration by clicking on selected points. This calibration space may have the form of a Cartesian cube space.

Morphometric functions require a scaling of the sensitive image space, wherein the position of the pointing stylus is detected. This may occur by fading defined scales into the coordinates and by a corresponding offset in the images to be measured by the calibration system.

During the calibration, the camera image of the real pointing device, for example, a three-dimensional stylus, is compared with the image in the virtual object space. A reference body drawn in the virtual object space, for example, an octahedron, can be clicked on the pixels, which the operator views in stereoscopic form. These pixels can then be acquired via the observation system and be offset with the aid of the computer for the display of the stereo images. The position of the pointing device, as viewed by the operator, is reflected by the observation system and can be adjusted by moving the stylus and clicking the calibration key in the case that the positions coincide with each other. In this manner, the operator handling the system is able to calibrate the system before the start of an application itself with the use of a calibration button on the pointing device.

The apparatus of the present invention can be used for design tasks in medical diagnosis and therapy, as well as in technical applications, for example, CAD, as well as in the 3-D design for arts and crafts. The pointing device can be used in particular for interactive tasks, for example, in enhancing and correcting displays of programs running on the computer. In this connection, processing occurs in the autostereoscopic display, which results in a change of the image data stored in the computer.

What is claimed is:

1. A method of processing image objects in three-dimensional displays, wherein an image object is displayed by an image generating means in a virtual image space, wherein pixels of the three-dimensional image space can be reached by a selection device, wherein a computer allocates coordinate values to the image object in accordance with its position, and wherein at least one spatial section of the image object is marked for processing by the selection device.

2. The method of claim 1, wherein the marked image object is segmented with respect to the other image objects displayed in the image space.

3. The method of claim 2, wherein for the segmentation in the virtual image space, the selection device is directed to the image object or guided along the boundary regions of the image project.

4. The method of claim 1, wherein the marked spatial section of the image object is enhanced by being colored or enlarged.

5. The method of claim 1, wherein the marked spatial section of the image object is measured.

6. The method of claim 1, wherein the spatical section of the image object is cut out from the three-dimensional display and displayed separately.

7. The method of claim 1, wherein the image object is segmented and/or measured by processing procedures of the computer, and that data for generating reference objects are stored in a storage device of the computer.

8. The method of claim 1, wherein an automatic segmentation and measurement of relevant image object sections are performed in the three-dimensional image space on the basis of reference objects.

9. The method of claim 1, wherein the display includes a segmentation, measurement, or selection of a specific image object, and image-analytical, cognitive, and knowledge-based systems.

10. The method of claim 1, wherein a manual segmentation or measurement of relevant sections of the image object, or the design of artificial image objects is carried out in the three-dimensional image space.

11. The method of claim 1, wherein the computer provides for processing procedures, preprocessing by filtering or compressing image data.

12. The method of claim 1, wherein the computer provides for processing procedures, including morphometrical evaluation, calibration, or cognitive modeling.

13. The method of claim 1, wherein the computer is programmed to provide basic processing procedures for processing the image objects and for applying with the method, specific analysis, diagnosis, calibrating, and interface procedures.

14. The method of claim 1, wherein the three-dimensional display is an autostereoscopic display, wherein the image generating means is a display screen, before which the three-dimensional display appears to float in the image space.

15. The method of claim 1, wherein the selection device is a pointing stylus, which permits indicating a certain pixel in the virtual image space and selecting it via a push-button on the pointing stylus.

16. The method of claim 15, wherein the selection device is used to design artificial image objects in the virtual image space.

17. An apparatus for processing and modifying three-dimensional displays, comprising a computer for generating image data, a display screen for a three-dimensional display of the image data in a virtual image space, a pointing device for manually influencing the three-dimensional display, wherein the pointing device is freely movable in the image space and comprises a transmission means for transmitting its position to the computer, and wherein the computer allocates to the pointing device, corresponding to its position, a pixel of the three-dimensional display.

18. The apparatus of claim 17, wherein the computer allocates to the pointing device exactly the pixel to which the pointing device is directed in the virtual space.

19. The apparatus of claim 17, wherein the transmitting means is a transmitting and/or receiving unit for a wireless data transmission.

20. The apparatus of claim 17, wherein the pointing device is designed and constructed as a stylus, with a tip that is locatable in the space.

21. The apparatus of claim 17, wherein that the pointing device comprises at least one selection device for selecting a pixel and/or for starting a processing.

22. The apparatus of claim 17, wherein one of different processing procedures can be associated to the pointing device as a virtual tool head for processing the three-dimensional display.

23. The apparatus of claim 17, wherein the computer is programmed for allocating to the pointing device processing procedures which comprise raising or deepening contours, or applying gravures or textures, or segmenting, or filtering, or shading, or coloring, or drawing.

24. The apparatus of claim 17, wherein a modification of the three-dimensional display is calculated in the computer by the processing procedure linked to the pointing device, and displayed on the image generating means in real time.

25. The apparatus of claim 17, wherein the computer allocates to the pointing device a processing procedure upon request, via an input device of the computer.

26. The apparatus of claim 17, wherein corresponding to the position of the pointing device an icon is displayed in the virtual image space, the icon being a blinking cursor, or a hand, or a tool.

27. The apparatus of claim 26, wherein the icon is displayed in the virtual image space upon request.

28. The apparatus of claim 26, wherein a measuring function, the icons, and a processing procedure are saved in a memory of the computer.

29. The apparatus of claim 17, wherein the positioning of the pointing device is assisted by a virtual scale in the three-dimensional image space or other measuring functions.

30. The apparatus of claim 17, wherein the three-dimensional display on the screen is autostereoscopic.

31. The apparatus of claim 17, wherein the pointing device comprises an infrared transmitting device and/or two light sources, which generate spaced-apart light spots that can be evaluated for determining the position and location of the pointing device.

32. The apparatus of claim 31, wherein infrared stereo cameras are provided for detecting at least one light spot, and for detecting the position, or angle of rotation of the pointing device.

33. The apparatus of claim 17, wherein for determining the angle of rotation of the pointing device, a plurality of light diodes, in different colors or with different signals are provided, which can be stereoscopically detected in real time, and which can be used for determining the angle of rotation of the pointing device.

34. The apparatus of claim 17, wherein the virtual display space is formed by cameras which are arranged in front of the 3-D display, and that the display is defined by the depth of focus of the cameras or their orientation.

35. The apparatus of claim 17, wherein during a calibration the real pointing device is aligned with the image displayed in the virtual object space.

* * * * *

UNITED STATES PATENT AND TRADEMARK OFFICE
CERTIFICATE OF CORRECTION

PATENT NO. : 6,734,847 B1
DATED : May 11, 2004
INVENTOR(S) : Baldeweg et al.

It is certified that error appears in the above-identified patent and that said Letters Patent is hereby corrected as shown below:

Column 9,
Line 49, delete "spatical".

Column 11,
Line 1, "26" should read -- 17 --.

Signed and Sealed this

Tenth Day of August, 2004

JON W. DUDAS
*Acting Director of the United States Patent and Trademark Office*